United States Patent

Kobayashi et al.

[11] Patent Number: 5,985,080
[45] Date of Patent: Nov. 16, 1999

[54] PROCESS FOR PRODUCING A RESIN-METAL LAMINATE

[75] Inventors: Akira Kobayashi, Chigasaki; Norimasa Maida, Yokohama; Koji Yamada, Yokohama; Katsuhiro Imazu, Yokohama, all of Japan

[73] Assignee: Toyo Seikan Kaisha, Ltd., Tokyo, Japan

[21] Appl. No.: 08/968,532

[22] Filed: Nov. 12, 1997

[30] Foreign Application Priority Data

Nov. 11, 1996 [JP] Japan .................................... 8-299056
Nov. 11, 1996 [JP] Japan .................................... 8-299057

[51] Int. Cl.$^6$ .......................... B32B 15/08; B32B 31/20; B05D 1/00
[52] U.S. Cl. .............................. 156/244.24; 156/244.27; 156/309.9; 156/324; 427/209; 427/365
[58] Field of Search ..................... 156/244.23, 244.24, 156/244.27, 309.9, 322, 324; 427/209, 211, 365

[56] References Cited

U.S. PATENT DOCUMENTS

| | | |
|---|---|---|
| 3,354,015 | 11/1967 | Klusmire et al. . |
| 4,306,927 | 12/1981 | Funk et al. . |
| 4,390,489 | 6/1983 | Segal . |
| 5,093,208 | 3/1992 | Heyes et al. . |
| 5,407,702 | 4/1995 | Smith et al. . |
| 5,770,274 | 6/1998 | Christel . |

FOREIGN PATENT DOCUMENTS

| | | |
|---|---|---|
| 60-11335 | 1/1985 | Japan . |
| WO 96/32202 | 10/1996 | WIPO . |

OTHER PUBLICATIONS

Patent Abstracts of Japan, vol. 009, No. 128 (M–384), Jun. 4, 1985 for JP 60 011335 A (Matsushita Denko KK), Jan. 21, 1985.

*Primary Examiner*—Sam Chuan Yao
*Attorney, Agent, or Firm*—Sughrue, Mion, Zinn, Macpeak & Seas, PLLC

[57] ABSTRACT

The process for producing a resin-metal laminate material of the present invention is characterized by comprising providing a heating zone for a metal substrate, a die for feeding a thermoplastic resin in a film form, a pair of temperate laminate rolls for adhering the thermoplastic resin to at least one surface of the metal substrate, and quenching means for quenching the resulting laminate material, along a passage for the metal substrate, supporting and conveying a molten film of the thermoplastic resin from the die with the corresponding temperate laminate rolls and feeding it to a nipping position between the temperate laminate rolls, and fusing the thin film of the thermoplastic resin to at least one surface of the heated metal substrate by means of the temperate laminate rolls. This method can lead to the formation of a uniform and thin-film resin coating on the metal substrate at a high speed, and in addition, the formed resin film has very high intimate adhesiveness and film properties.

17 Claims, 7 Drawing Sheets

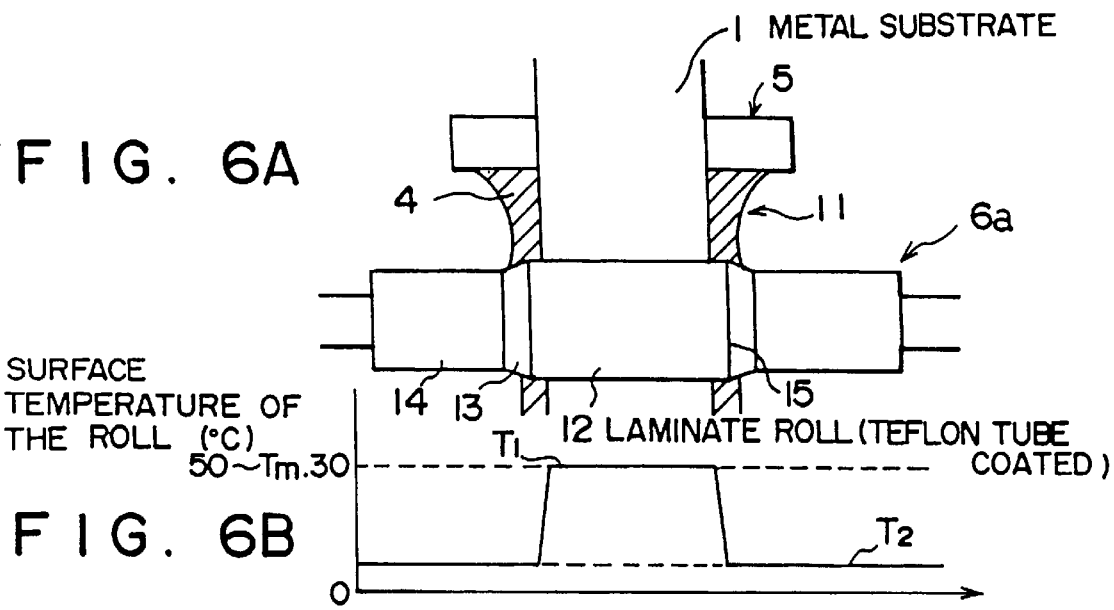
FIG. 6A
FIG. 6B
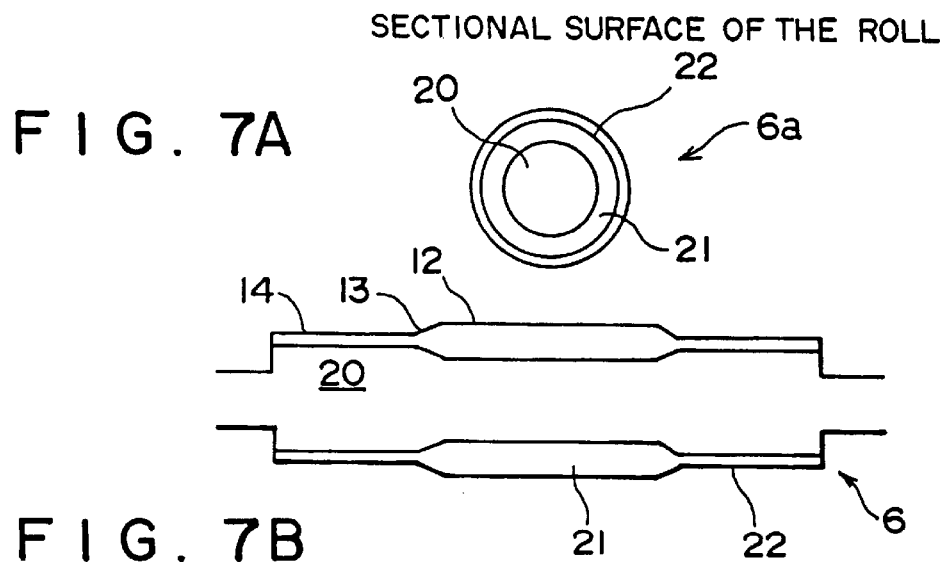
FIG. 7A
FIG. 7B

PROCESS FOR PRODUCING A RESIN-METAL LAMINATE

BACKGROUND OF THE INVENTION

1. Field of the Invention

This invention relates to a process for producing a resin-metal laminate material, and more specifically to an extrusion laminate process for producing a resin-metal laminate material, especially a metal laminate material coated with a resin on both surfaces, in which a resin coating is a thin film having high performances such as the uniformity of thickness, high processability, high adhesion properties and high film properties, at a high speed.

2. Description of Prior Art

It has heretofore been widely practiced to coat a metal surface with a resin layer as means for imparting corrosion resistance to a metal material. The coating methods used in this technique include a method of painting a dispersion of a thermosetting resin such as an epoxy resin, a phenol resin, an acrylic resin or a polyester resin in a solvent on a metal surface and a method of adhering a pre-formed film of, for example, a polyester type, an olefin resin type, or a polyamide type to a metal substrate through an adhesive such as an isocyanate type, an epoxy type or a phenol type.

It is well known to utilize the heat fusion of a thermoplastic resin in adhering a metal substrate to the thermoplastic resin. This technique includes a method of adhering a pre-formed film of, for example, a thermoplastic polyester to a metal plate by heat adhesion, and a method of adhering a molten thin film of an extruded thermoplastic polyester resin to a metal plate.

Japanese Laid-Open Patent Publication No. 137760/1976 describes a coating apparatus for coating a synthetic resin on both surfaces of a sheet such as paper or an aluminum foil comprising two T dies standing opposite to each other and a sheet feeding apparatus provided to travel the sheet between the two T dies, characterized in that during the travel of the sheet, the synthetic resin is extruded from the two T dies to form synthetic resin layers simultaneously on both sides of the sheet. FIGS. 1 and 4 of this patent publication show that after the synthetic resin layers are extruded onto the sheet, the resin layers are passed between the quenching rolls.

U.S. Pat. No. 5,407,702 describes a method of coating by extruding a resin on both surfaces of a metal strip while making a film. It is described that the metal strip of an aluminum alloy is moved through a preliminary conditioner, two extrusion dies, an after-heating machine and a quenching system, and both surfaces of the metal strip are coated with a thin coating of a polyester material. In the apparatus shown in FIG. 1 of this patent, it is described that a thin film of the polyester extruded from the die is elongated into a thin film by a first roll, and cooled by a second roll, and is adhered to the heated metal strip by a third roll.

Japanese Laid-Open Patent Publication No. 79801/1994 describes a process of producing a metal plate coated with a resin on both surfaces, which comprises pressing a press-contacting roll on a pre-heated metal plate which is wound on a winding roll, flowing down a molten thermoplastic resin from a T die via an extruder into a gap between the press-adhering roll and the metal plate to provisionally adhere and coat the thermoplastic resin on the metal plate, winding this resin-coated metal plate on another wind-up roll so that the resin-coated surface contacts the wind-up roll side, pressing another press-contacting roll from the side of the metal plate, flowing down a molten thermoplastic resin from a T die via an extruder into a gap between the other press-contacting roll and the metal plate to provisionally adhere and coat the thermoplastic resin to the other surface of the metal plate to give a coated metal plate in which both surfaces are coated with the resin and thereafter, heating the coated metal plate in which both surfaces are coated with the resin by a heating apparatus located downstream.

However, these known techniques are still sufficiently satisfactory to produce a resin metal laminate, in which a resin coating is a thin film and has high performances such as the uniformity of thickness, high processability, high adhesion property and high film properties, at a high speed.

The above cited first technique may be applied to the production of a laminate of a soft wrapping material typified by a pouch, but cannot be applied to the production of a can-making laminate material. In a soft wrapping material laminate, the metal is a very thin metal foil which is intended to impart gas barrier property, but other resin layer is a thick layer which can impart heat sealability and also act as a stress carrier. On the other hand, in a can-making laminate material, the metal can act as a stress carrier, and is subjected to various processings such as press processing, deep draw formation, bend-elongation processing, and ironing working. Furthermore, the resin coated layer must be thin and within a range in which corrosion resistance, adhesiveness and the uniformity of the film are ensured with respect to processability. It is difficult to use the above-mentioned first technique to apply a thin resin film onto a metal surface, and thus, is not suitable for the production of a can-making laminate material.

The cited second and third techniques can be recognized to be applicable to the production of a can-making laminate material. From the viewpoint of producing a resin metal laminate material having high performances, these techniques are still not satisfactory. These techniques require the operation of heating a metal plate prior to the lamination of a resin such as a polyester, and the operation of heating the resin metal laminate material after the lamination of the resin to complete the fusion and adhesion of the resin. The operation of heating the metal plate or the resin-coated metal plate several times at a high temperature of more than the melting point of the polyester causes the heat softening of the metal plate and the deterioration of the resin by heat decomposition or heat oxidation, and results unpreferably in the lowering of the various properties of the laminate material. The lowering of the properties of the laminate material becomes marked as the time of heating is frequent, and as the thickness of the thin resin film is generally decreased.

Furthermore, in the production of a can-making resin metal laminate material, there is a technical problem in which a thin resin film should be firmly adhered to a metal plate with a uniform thickness. For example, in the case of a film biaxially stretched in advance, a laminate by heat-adhering in a relatively uniform thickness may be possible. But a film should be formed and stretched in a separate step, and the steps may become complicated. On the other hand, in the case of an extruded coating in the above-cited second technique, complicated operations of cooling and film formation must be carried out while an extruded molten resin is elongated in a thin film. At the time of film formation, the surface temperature of the resin is lowered, and a firm heat film adhesion to a metal plate becomes difficult. Furthermore, as the film becomes thinner and travels at a higher speed, the occurrence of creases of the resin film on the third roll may be apprehended.

SUMMARY OF THE INVENTION

It is an object of the present invention to provide a process for producing a resin metal laminate material, in which the resin coating is a thin film and has high performances such as the uniformity of thickness, high processability, high adhesiveness and high film properties, at a high speed.

It is another object of the present invention to provide a process for producing a both-side resin coated metal laminate material, in which a thermoplastic resin is coated simultaneously on both surfaces of a metal material and the resin coating is a thin film and has high properties such as the uniformity of thickness, high processability, high adhesiveness and high film properties, at a high speed.

It is yet another object of the present invention to provide a process for producing a resin metal laminate material in which the heating and softening of the resin and the heat degeneration or heat oxidation of the resin are prevented as much as possible, and the resin is a uniform thin film but has markedly excellent adhesiveness to the metal.

A further object of the present invention is to provide a process for producing a resin metal laminate material useful for can-making, in which the formed resin metal laminate can withstand a high degree of processing, such as deep draw formation, bend-elongation working, and ironing working and the molded product after processing has excellent corrosion resistance.

According to the present invention, there is provided a process for producing a resin metal laminate material by forming a resin coating on at least one surface of a metal substrate, which comprises providing a heating zone for the metal substrate, a die for feeding a thermoplastic resin in a film form, a pair of temperate laminate rolls for adhering the thermoplastic resin to at least one surface of the metal substrate, and quenching means for quenching the resulting laminate material along a passage of the metal substrate, supporting and conveying a molten film of the thermoplastic resin from the die with the corresponding temperate laminate rolls and feeding the molten film to a nipping position between the temperate laminate rolls, and fusing a thin film of the thermoplastic resin to at least one surface of the heated metal substrate by the temperate laminate rolls.

According to the present invention, there is also provided a process for producing a both surface resin coated metal laminate material by forming a resin coating on both surfaces of a metal substrate, which comprises providing a heating zone of the metal substrate, a die for feeding a pair of thermoplastic resins in a film form standing opposite to each other with respect to a passage of the heated metal substrate, a pair of temperate laminate rolls for adhering the thermoplastic resin on both surfaces of the metal substrate, and quenching means for quenching the resulting laminate material along the passage of the metal substrate, passing the heated metal substrate between the pair of the temperate laminate rolls approximately at right angles to a line connecting the centers of the temperate laminate rolls, supporting and conveying a molten film of the thermplastic resins from each die to the corresponding laminate roll and feeding the film to a nipping position between the temperate laminate rolls, and simultaneously fusing the thin film of the thermoplastic resin onto both surfaces of the metal substrate.

In the present invention, the molten film of the thermoplastic resin from the die is preferably conducted to the temperate laminate rolls approximately in a tangential direction of the temperate laminate rolls so that the winding angle (θ) to the temperate laminate rolls becomes 2 to 45', especially 2 to 30', and the thin film of the thermoplastic resin is fused on both surfaces of the heated metal substrate by the temperate laminate rolls.

BRIEF DESCRIPTION OF DRAWINGS

FIG. 6 shows an explanatory view showing the relation between the arrangement of laminate rolls and a temperature distribution.

FIG. 7 is a partial sectional side view showing an example of the structure and arrangement of laminate rolls.

DETAILED DESCRIPTION OF PREFERRED EMBODIMENT

Figure 1:
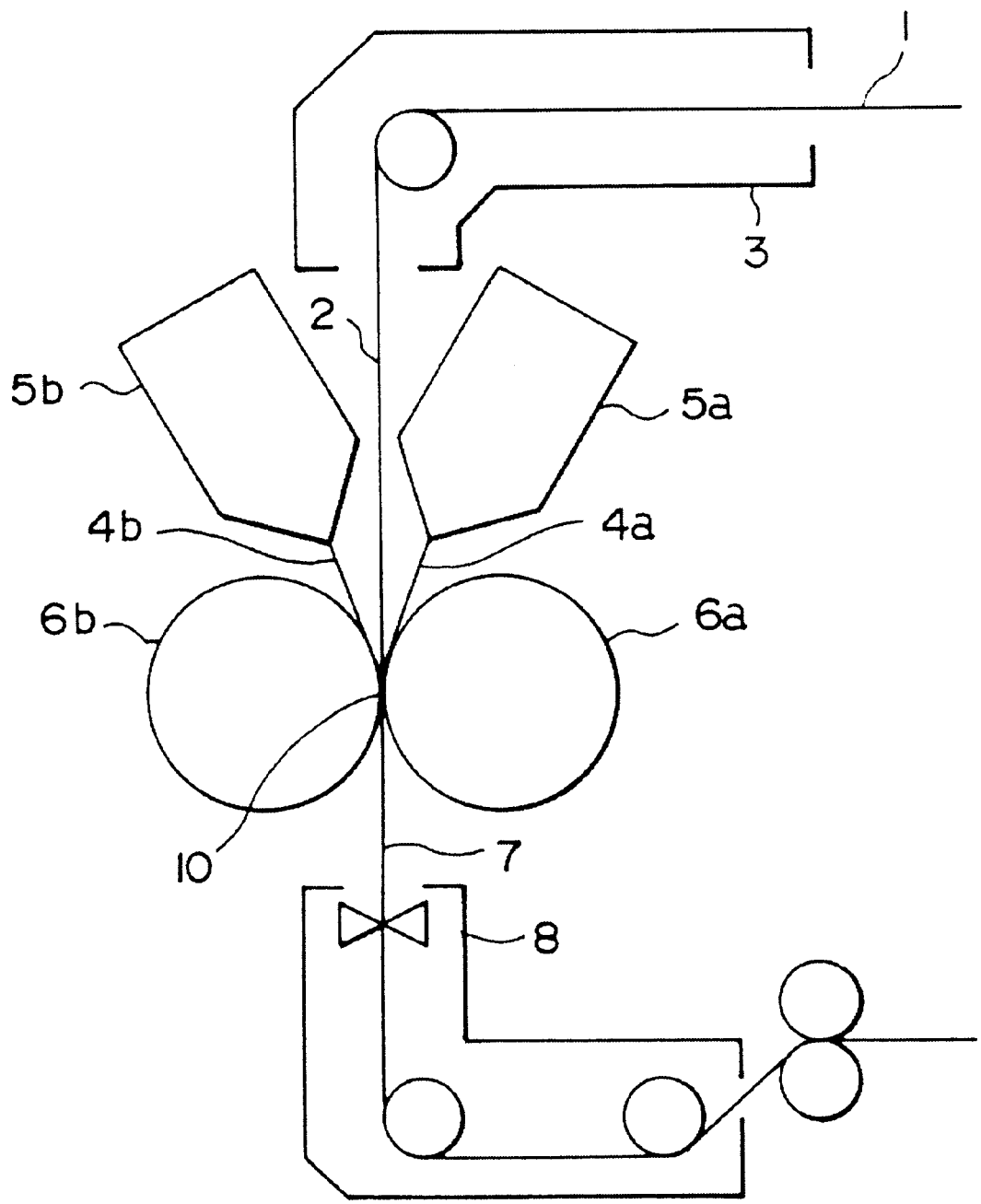
FIG. 1 shows an arrangement of a side view of the apparatus used in the present invention.

In FIG. 1 showing the arrangement of the apparatus used in the present invention, along a passage 2 of a metal substrate 1, a heating zone 3 for the metal substrate 1, a die 5 for feeding a thermoplastic resin 4 in a thin film form, a pair of temperate laminate rolls 6a and 6b for adhering the thermoplastic resin 4 to at least one surface of the metal-substrate 1, and quenching means 8 for quenching a laminate material 7 formed are provided.

The present invention is markedly characterized in that (1) temperate laminate rolls 6a and 6b are used as laminate rolls, (2) a molten film 4 of a thermoplastic resin from a die 5 is supported and conveyed by a corresponding temperate laminate roll 6a and fed to a nipping position 10 between temperate laminate rolls 6a and 6b and preferably (3) the metal substrate 1 is passed between a pair of temperate laminate rolls 6a and 6b approximately at right angles to a line connecting the centers of the temperate laminate rolls 6a and 6b.

It is essential to utilize the heat possessed by each material effectively in order to prevent the lowering of the performances of the metal substrate and the thermoplastic resin due to excessive heating. To achieve this prevention, the combination of the above means (1) and (2) or the additional combination of means (3) is very effective. By the combination of these means, at least one surface of the metal substrate is covered with the thermoplastic resin. As a result, an effect is achieved to give a resin coated metal laminate material, especially a both surface resin coated metal laminate material, having high performances such as the uniformity of thickness, high processability, high adhesiveness and high film properties at a high speed, in which the resin coating is a thin film.

Heretofore, cooled laminate rolls have been generally used as laminate rolls used to fuse a thermoplastic resin to a metal substrate. In the present invention, one characteristic is to use temperate laminate rolls. The "temperate" is a concept which stands midway between "cold" and "hot". It means a treatment conducted at a temperature which is higher than room temperature and lower than the melting point of the thermoplastic resin.

In the present invention, by conducting the treatment with temperate laminate rolls, a rapid transfer of heat to a resin which contacts the roll is restrained, and the heat possessed by the heated metal substrate and the heat possessed by the melt-extruded resin can be effectively utilized to perform heat adhesion.

In the process for production according to the present invention, a molten film 4 of the thermoplastic resin from a die 5 is conducted to the corresponding temperate laminate roll 6a, and at this time, it is important to support and convey the molten thin film 4 by the temperate laminate roll 6a, and to feed it to a nipping position 10.

Figure 2:
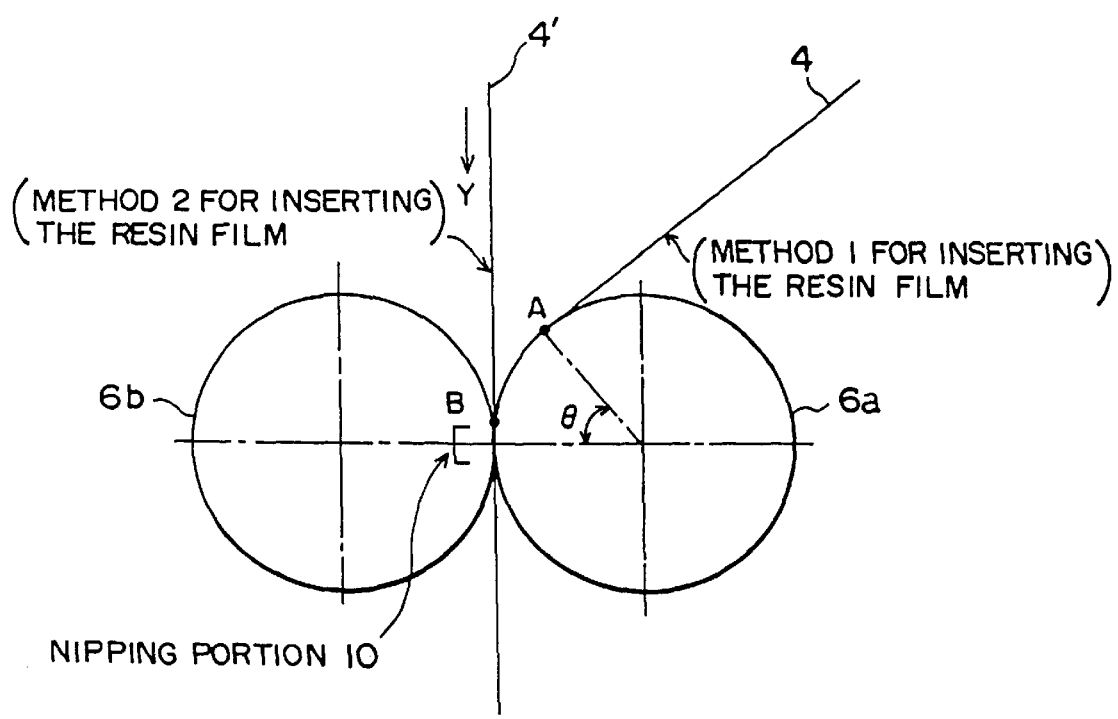
FIG. 2 is a view for illustrating the manner of feeding a thermoplastic resin melt to a laminate roll.

In FIG. 2 for illustrating the manner of feeding the molten mass of the thermoplastic resin to the laminate roll, the feeding of the molten mass of the thermoplastic resin includes a method (called "method 1") in which the molten resin 4 from the die is once supported and conveyed by the temperate laminate roll 6a and fed to a nipping position and a second method (called "method 2") in which the molten resin 4 is introduced between a pair of temperate laminate rolls and approximately at right angles (in Y direction) to a line connecting the centers of the temperate laminate rolls.

In the case of an ordinary extrusion laminate, especially when the resin layer has a small thickness (this point differs from a laminate for the production of a soft wrapping material), the above-mentioned method 2 is generally employed to prevent the lowering of the temperature of the resin by contacting the roll. However, by this method, since the molten film of the thermoplastic resin is fed directly to the nipping position, the state of feeding becomes unstable by all means. An uneven thickness or a crease is developed by waving, and poor adhesion or defects of a coating owing to the infolding of air cannot be avoided. In order to alleviate these defects, the speed of laminating must be retarded, but the speed of production becomes slow. Since the molten film of the thermoplastic resin suddenly contacts the laminate rolls under an elevated pressure at the nipping position, the resin adheres to the surfaces of the rolls and is transferred thereto. Thus, the resin layer on the surface of the metal substrate tends to have many defects.

On the other hand, in the present invention, the temperate laminate roll method (1) is employed. As a method of feeding the molten film of the thermoplastic resin, the temperate roll conveying method (2) is employed, whereby the molten film of the thermoplastic resin is supported by the temperate roll surface on the surface opposite to the adhesive surface, and is fed to the nipping position in this supported condition. Accordingly, the feeding condition at the nipping position becomes stable. As a result, an uneveness in thickness or a crease due to waving is not developed, or infolding of air by infolding of air is not developed, and the resulting coating has excellent coverage without defects. For this reason, the laminating speed can be markedly fast as compared with the prior art, and it becomes possible to increase the productivity. Furthermore, the molten film of the thermoplastic resin contacts the temperate laminate roll for the first time under a very low pressure and then is pressurized at the nipping position. The resin does not tend to adhere and proceed to the surface of the roll, and the resin layer on the surface of the metal substrate has no defects.

In the present invention, it is important that a combination of the temperate laminate roll method (1) and the roll conveying method (2) of a molten film of the resin increases the adhesiveness of the coating and the molten film of the resin is fed to the nipping position stably in a sufficiently thin condition. This combination method of the present invention makes it possible to feed the resin to the nipping position in a temperature distribution structure in which that side of the adhesive surface of the resin is fully molten and the very surface layer alone on an opposite side is solidified.

Figure 3:
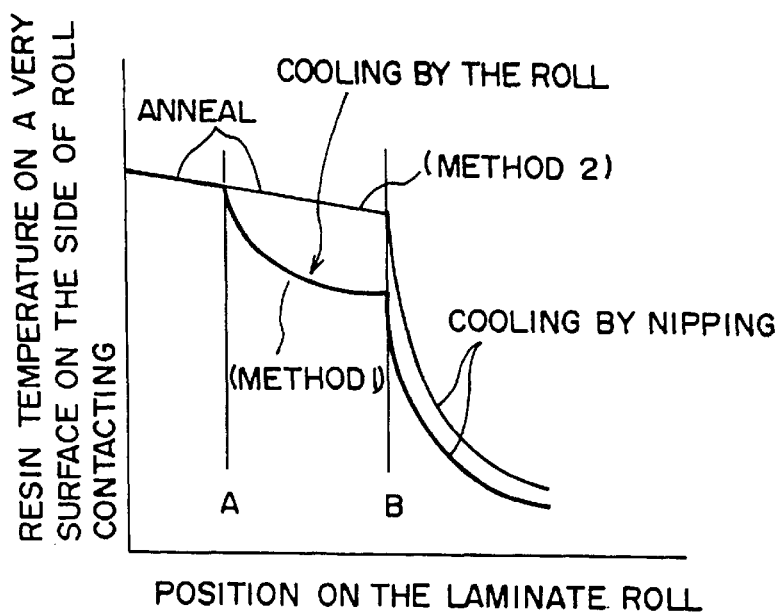
FIG. 3 is a graphic representation showing the relation between a moving distance from a certain position of a molten resin passage to a temperate laminate roll and a resin temperature of a very surface on a roll contacting side.

In regard to the methods 1 and 2, in FIG. 3 which shows the relation between the moving distance from a certain position of a molten resin passage to the temperate laminate roll and the resin temperature on the very surface of contacting side of the roll, in the case of the method 2 (shown by a fine line), the surface temperature of the resin only decreases at a speed corresponding to a cooling speed in air. The resin reaches the nipping initiation position B when the resin has a considerably high temperature, and in this condition, the resin receives a nipping pressure. For this reason, as already pointed out, the molten resin tends to develop adhesion to the roll, and the condition of the coating on the resulting laminate material is very unsatisfactory in respect of the completeness of the coating, or the uniformity of thickness, and also in respect of the smoothness.

On the other hand, in the case of the method 1, as shown by a thick line in FIG. 3, the very thin layer alone contacting the temperate roll at a contact point A is slightly cooled (solidified), thereafter the nipping pressure is exerted at the nipping position B, and the thermoplastic resin does not adhere to the roll. Furthermore, the completeness of the coating, the uniformity of thickness, and the smoothness are excellent. Furthermore, since in the present invention, adhesion of the thermoplastic resin onto the surface of the roll is prevented, nipping of the coating at a higher pressure becomes possible whereby the adhesiveness between the metal substrate and the resin is increased, and the infolding of air can be prevented.

By supporting and conveying the molten resin from the die with the temperate laminate rolls in the present invention (method 1), it becomes possible to flow the molten resin stably to the nipping position, and the molten mass of the thermoplastic resin can be fully and stably formed into a thin film corresponding to a ratio of the extruding speed from the die outlet and the peripheral speed of the temperate laminate roll. In the case of method 2, the molten mass of the thermoplastic resin can be formed into a thin film corresponding to a ratio of the extruding speed from the die outlet and the peripheral speed of the temperate laminate roll. But since there is no supporting and conveying of the molten resin on the roll, the reduction in thickness by flowing and stretching becomes unstable and a thickness uneveness tends to be developed at a resin reservoir (bank). On the other hand, by supporting and conveying the resin with the temperate laminate roll, the resin can be subjected to back tension, and the development of a bank can be solved.

In the production method of the present invention, the metal substrate 1 heated in the heating zone 3 is conducted to the nipping position between the temperate laminated rolls 6a and 6b. It is especially preferred that the passage 2 of the metal substrate and the temperate laminate rolls 6a and 6b should be provided in the position relationship shown in the above-mentioned (3). By this arrangement, until the metal substrate 1 reaches the nipping position 10 of the temperate laminate rolls 6a and 6b, its contact with other members is avoided, and the lowering of the surface temperature of the metal substrate 1 is maintained at the slowest speed corresponding to the cooling speed of the case that the substrate is left in the air.

For this reason, in this embodiment of the present invention, the temperature and the heat capacity of the metal substrate 1 may be effectively used for heat fusion to the thin film of the thermoplastic resin to obtain a high adhesion strength between the thermoplastic resin 4 and the metal substrate 1 without requiring re-heating. When the metal substrate 1 is wound up on a laminate roll, the temperature of the metal substrate 1 is decreased by contacting due to winding up on the laminate roll. Unless re-heating is performed after the lamination, intimate adhesion between the metal substrate and the thermoplastic resin layer lacks, but in the present invention, this lowering of temperature is avoided.

In the present invention, it is preferred that the molten film 4 of the thermoplastic resin from the die 5 is conducted on the temperate laminate roll approximately in a tangential direction of the temperate laminate roll 6 so that the winding angle ($\theta$) to the temperate laminate roll 6 becomes 2 to 45 , especially 2 to 30 , and by the temperate laminate roll, a thin film of the thermoplastic resin is preferably fused to at least one surface of the metal substrate.

In the present specification, the winding angle ($\theta$) to the temperate laminate roll means an angle ($\theta$) formed by a contact point A between the molten film of the thermoplastic resin and the temperate laminate roll 6 and a line connecting the centers of a pair of the temperate laminate rolls with respect to the centers of the temperate laminate rolls in FIG. 2. In methods 1 and 2, the nipping position is not a line, but is usually existent over the width N.

Figure 4:
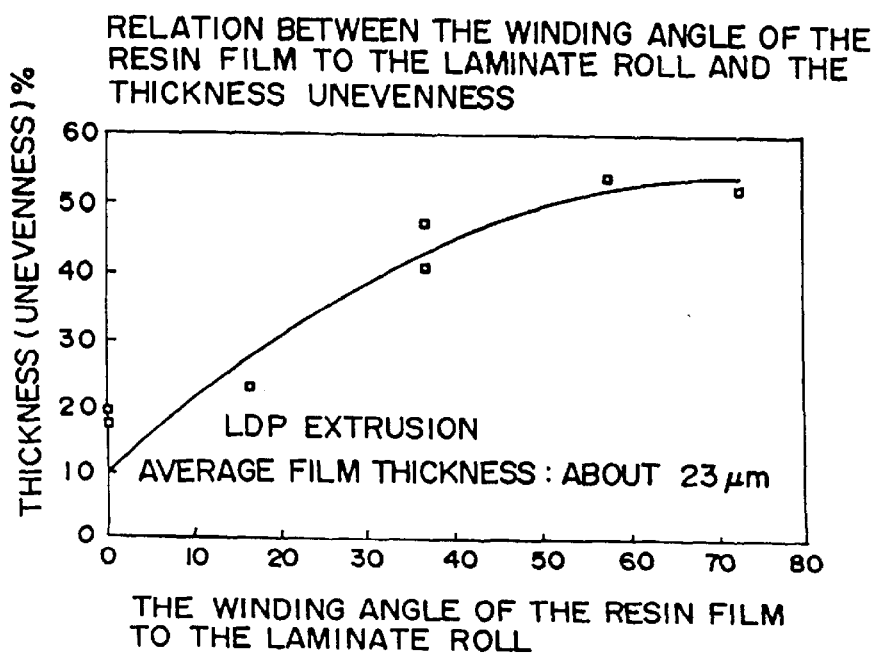
FIG. 4 is a graph plotting the relation between the winding angle of the resin film and the film thickness uneveness.

It is especially preferred in this invention that the winding angle $\theta$ of the resin to the temperate laminate roll is maintained in the range mentioned above. When this widing angle $\theta$ is larger than the above range, the temperature of that side of the thermoplastic resin which contacts the metal substrate is lowered, and a satisfactory intimate adhesive force cannot be obtained with respect to the metal substrate. When the winding angle $\theta$ is furthermore larger than the above-mentioned range, flexion of the resin layer occurs on the temperate laminate roll, and uneveness of thickness tends to be developed. FIG. 4 plots the relation between the winding angle of the resin film and its thickness uneveness when an experiment is carried out by using another apparatus different from the apparatus of the present invention without using a metal substrate. It is understood from this figure that the winding angle can be below a certain range.

According to this invention, a resin metal laminate material discharged from the temperate laminate rolls is conducted to the quenching means and quenched to provide a resin metal laminate material in which the resin coating is a thin film and has high performances such as the uniformity of thickness, high processability, high adhesiveness and high film properties.

In the present invention, heat adhesion is possible by effectively utilizing the heat which the metal substrate heated to a minimum necessary temperature owns, and re-heating for fusion is not necessary. Accordingly, heat-softening of metal and the heat decomposition or heat oxidation of the resin are prevented as much as possible to increase various properties of the laminate material. As a result, the resulting resin metal laminate material can withstand processings with a large degree of processing such as deep draw-formation, bend-elongation processing, and ironing working, and it is possible to provide a can-making resin metal laminate material in which the molded product after processing possesses excellent corrosion resistance. It should be understood that it is allowed to increase the degree of intimate adhesiveness by re-heating the laminate material within a range in which heat softening of metal and the heat degradation or the heat oxidation of the resin do not substantially occur.

Furthermore, since according to this invention, the temperature of the metal substrate can be held, the temperature of the adhesive side of the resin of the extruded resin can be held, and the thickness reduction of the resin and the introduction of the resin to the nipping position can be easily performed, the workability of the laminate material is very good. It is possible to produce the resin metal laminate material at a high speed, and the production process also possesses excellent productivity and economy.

The process of the present invention is especially effective in pasting a resin film to both surfaces of a metal substrate. It can also be applied to a method of pasting a molten film of a thermoplastic resin to one surface of the metal substrate 1, pasting a resin film formed in advance to the other surface, and performing these pasting operations on both surfaces simultaneously.

Figure 5:
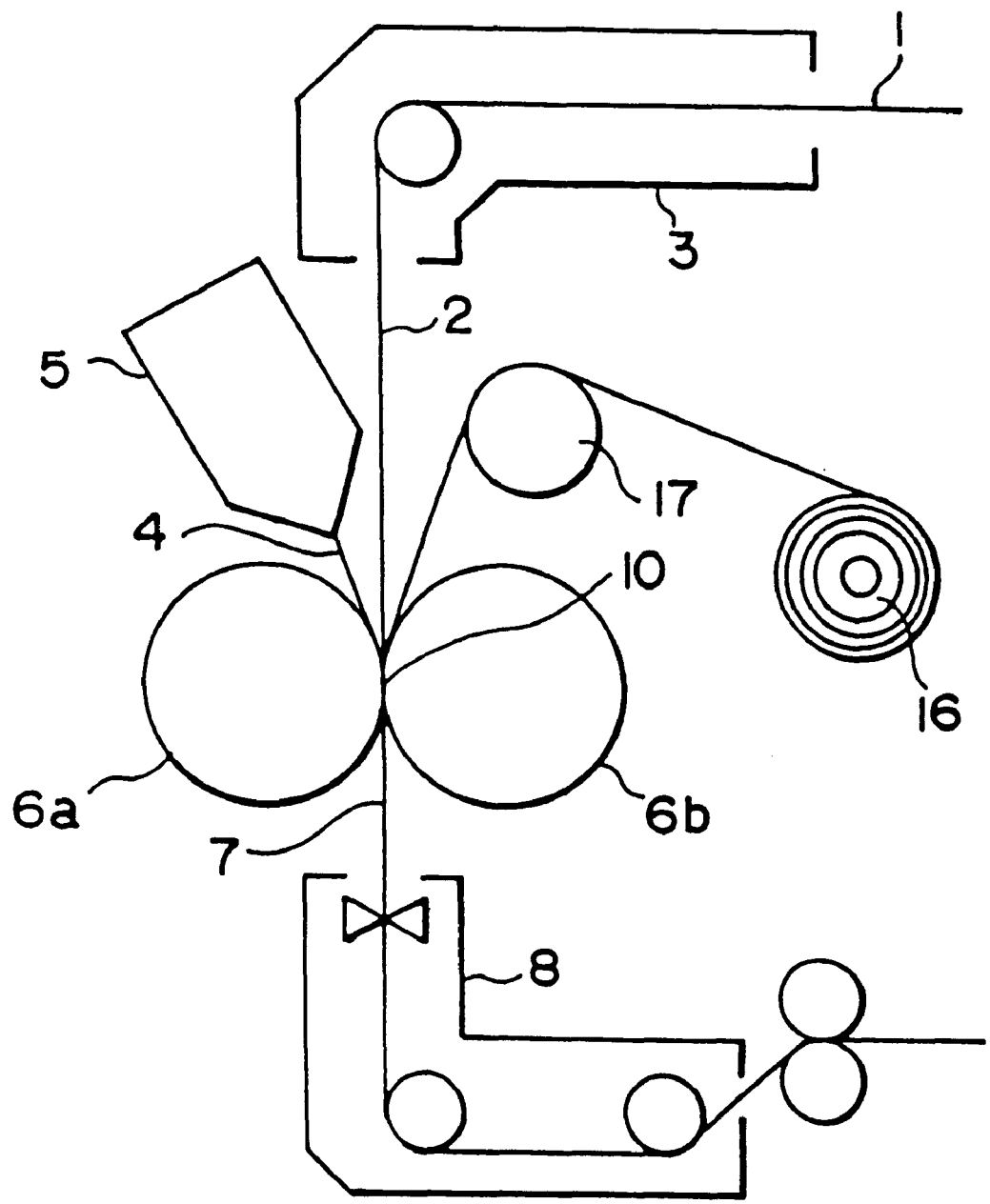
FIG. 5 is an arrangement of a side view of the apparatus used in another embodiment of this invention.

In FIG. 5 showing an arrangement of the apparatus in this embodiment, a basic arrangement is the same as in FIG. 1, but a die 5 is provided on one side of a passage 2 of the metal substrate 1, a molten film 4 of the thermoplastic resin is conducted onto a corresponding temperate laminate roll 6a, a wind-out reel 16 for a resin film 11 and a guide roll 17 are provided on the opposite side of the passage of the metal substrate, the resin film 11 is supported and conveyed with the temperate laminate roll 6b and then fed to the nipping position 10. By this operation, the thin film 4 of the thermoplastic resin and the resin film 11 are fused simultaneously to both surfaces of the metal substrate 1. The supporting and conveying of the resin film are the same as those of the molten film of the resin. A cast film or a biaxially stretched film of a thermoplastic resin may be used as the resin film. This embodiment is useful when the inner surface and the outer surface of a laminated metal container require quite different properties, and when both advantages of an extrusion coat and a film lamination can be utilized.

In the case of the above-mentioned method 1, it is impossible to heat-adhere the thermoplastic resin simultaneously to both surfaces of the metal substrate, and adherence to one surface must be carried out successively. The method involves difficulty because the step becomes long, and the apparatus is complicated. Furthermore, prior to adhesion in each step, the metal substrate or the laminate material must be heated. Thus, a degradation in the property of the metal substrate or the thermoplastic resin cannot be avoided.

On the other hand, in the method shown in FIG. 5, simultaneous coating of the resin on both surfaces of the metal substrate can be performed whereby the number of steps can be reduced, and the apparatus can be markedly simplified. Furthermore, heating for heat adhesion may be over by the first heating of the metal substrate, and the lowering of properties of the metal or the resin due to repeated heating can be suppressed.

[Metal Blank]

Various surface-treated steel plates, light metal plates or foils of these plates may be used as the metal substrate in the present invention.

The surface-treated steel plates may be obtained by annealing a cold rolled steel plate, thereafter quality adjust rolling the resulting plate, or subjecting the resulting plate to a secondary cold rolling, and performing one or at least two surface treatments such as zinc plating, tin plating, nickel plating, electrolytic chromic acid treatment and chromic acid treatment. One preferred example of surface-treated steel plate is an electrolytic chromic acid treated steel plate, especially having 10 to 200 mg/m$^2$ of a metallic chromium layer and 1 to 50 mg/m$^2$ (calculated as metallic chromium) of a chromium oxide layer. This treated steel plate has a combination of excellent film adhesiveness and corrosion resistance. Other examples of the surface-treated steel plates include a hard tin plate containing a tin plating of 0.6 to 11.2 g/m$^2$. This tin plate is desirably subjected to a chromic acid treatment or a chromic acid/phosphoric acid treatment to provide a chromium amount of 1 to 30 mg/m$^2$ (calculated as metallic chromium).

Other examples include aluminum coated steel plates subjected to aluminum plating or aluminum bonding.

The light metal plates include a so-called pure aluminum plate and aluminum alloy plates. An aluminum alloy plate having excellent corrosion resistance and processability has a composition comprising 0.2 to 1.5% by weight of Mn, 0.8 to 5% by weight of Mg, 0.25 to 0.3% by weight of Zn, 0.16 to 0.26% by weight of Cu, and the reminder being Al. These light metal plates is desirably subjected to a chromic acid treatment or a chromic acid/phosphoric acid treatment so as to provide a chromium amount (calculated as metallic chromium) of 20 to 300 mg/m$^2$.

The thickness of the metal plate differs according to the type of the metal and the utility and size of the laminate material. Generally, the metal plates should preferably have a thickness of 0.10 to 0.50 mm. Among them, the surface-treated steel plates should preferably have a thickness of 0.10 to 0.30 mm, and the light metal plates should preferably have a thickness of 0.15 to 0.40 mm.

The metal substrate may be provided with an adhesive primer. Such a primer shows excellent adhesiveness to both of the metal substrate and the thermoplastic resin. Typical examples of the primer paint having excellent intimate adhesiveness and corrosion resistance include phenol epoxy type paints composed of resol-type phenol aldehyede resin derived from various phenols and formaldehyde, and a bis-phenol-type epoxy resin, particularly a paint containing a phenol resin and an epoxy resin in a weight ratio of 50:50 to 5:95, especially a weight ratio of 40:60 to 10:90. The adhesive primer layer may be provided generally in a thickness of 0.3 to 5

[Thermoplastic Resins]

The thermoplastic resins may be extrusion-moldable and film-forming. Examples of these resins include polyolefins such as low-density polyethylene, high-density polyethylene, polypropylene, poly(1-butene), poly(4-methyl-1-pentene), or random or block copolymers of α-olefins such as ethylene, propylene, 1-butene and 4-methyl-1-pentene; ethylene/vinyl compound copolymers such as ethylene/vinyl acetate copolymer, ethylene/vinyl alcohol copolymer and ethylene/vinyl chloride copolymer; styrene resins such as polystyrene, acrylonitrile/styrene copolymer, ABS and a-methylstyrene/styrene copolymer; polyvinyl compounds such as polyvinyl chloride, polyvinylidene chloride, vinyl chloride/vinylidene chloride copolymer, poly(methyl acrylate) and poly(methyl methacrylate); polyamides such as nylon 6, nylon 6-6, nylon 6–10, nylon 11 and nylon 12; thermoplastic polyesters such as polyethylene terephthalate and polybutylene terephthalate; polycarbonate; polyphenylene oxide; and mixtures of the above resins.

As especially preferred thermoplastic resins having film properties, processability and corrosion resistance, thermoplastic polyesters or copolymerized polyesters or blends thereof, or laminates of the above-mentioned resins may be cited. Polyesters consisting mainly of an ethylene terephthalate unit are especially preferred.

The starting polyester used may be polyethylene terephthalate itself. But it is desirable to lower the maximum crystallization degree to which the coating can reach with respect to the shock resistance and processability of the laminate. For this purpose, a copolymerizing ester unit other than ethylene terephthalate may preferably be introduced into the polyester.

It is especially preferred to use a copolymerized polyester having a melting point of 210 to 252° C. containing an ethylene terephthalate unit as a major copolymer component and a minor amount of another ester unit. The homopolyethylene terephthalate has a melting point of generally 225 to 265° C.

Generally, at least 70 mole %, especially at least 75 mole %, of the dibasic acid component in the copolymerized polyester is composed of terephthalic acid, and at least 70 mole %, especially at least 75 mole %, of the diol component is composed of ethylene glycol. Preferably, 1 to 30 mole %, especially 5 to 25 mole %, of the dibasic acid component and/or the diol component is composed of a dibasic acid component other than terephthalic acid, or is composed of a diol component other than ethylene glycol.

Examples of a dibasic acid component other than terephthalic acid include one or a combination of at least two of aromatic dicarboxylic acids such as isophthalic acid, phthalic acid and naphthalenedicarboxylic acid; alicyclic dicarboxylic acids such as cyclohexanedicarboxylic acid; and aliphatic dicarboxylic acids such as succinic acid, adipic acid, sebacic acid and dodecandioic acid. Examples of diol components other than ethylene glycol include one or at least two of propylene glycol, 1,4-butanediol, diethylene glycol,1,6-hexyleneglycol, cyclohexane dimethanol, and an ethylene oxide adduct of bisphenol A. Of course, the combination of these comonomers can be such that the melting points of the copolymerized polyesters can be within the above range. Furthermore, they may be used in combination with polyfunctional monomers such as trimellitic acid, pyromellitic acid and pentaerythritol.

The polyesters used should have molecular weights sufficient to form films. For this purpose, the polyesters can desirably have an intrinsic viscosity (I.V) of 0.55 to 1.9 dl/g, especially 0.65 to 1.4 dl/g.

Inorganic fillers (pigments) may be included in the coating layers of the thermoplastic resins in order to conceal a metal plate, and further to assist transmission of a crease pushing force to the metal plate at the time of draw formation-redraw formation. Known film compounding agents, such as antiblocking agent, for example, amorphous silica, various antistatic agents, lubricants, antioxidants, and ultraviolet absorbers, may be compounded in the film in accordance with a known recipe.

Examples of the inorganic fillers include inorganic white pigments such as rutile or anatase type titanium dioxide, zinc flower and gloss white; white extender pigments such as barite, precipitated barite sulfate, calcium carbonate, gypsum, precipitated silica, aerosil, talc, fired or unfired clay, barium carbonate, alumina white, synthetic or natural mica, synthetic calcium silicate and magnesium carbonate; black pigments such as carbon black and magnetite; red pigments such as red iron oxide; yellow pigments such as sienna; and blue pigments such as ultramarine and cobalt blue. These inorganic fillers may be compounded in an amount of 10 to 500% by weight, especially 10 to 300% by weight.

[Production conditions]

In the present invention, it is preferred to heat the metal substrate to the melting point (Tm) of the thermoplastic resin −80° C. to Tm +50° C., especially Tm −50° C. to Tm +30° C. (the temperature immediately before entering the temperate laminate roll) when the metal substrate is made of TFS, and to a temperature ranging from (Tm −30° C.) to 250° C. when the metal substrate is made of Al. The metal substrate can be heated by using known heating means such as electrical heat generation, high frequency induction heating, infrared heating, blast furnace heating and roller heating.

If the heating temperature is lower than the above-mentioned range, intimate adhesive force is not sufficient. If it is higher than the above-mentioned range, heat softening of the metal tends to occur.

The die for extruding the thermoplastic resin may be any die used generally for the extrusion coating of the resin, such as a coat hanger type die, a fish tail type die and a straight manifold type die. The thermoplastic resin is heated and kneaded at a temperature above the melting temperature in an extruder, and extruded through the above-mentioned die.

The thermoplastic resin may be extruded as a laminated body. In this case, extruders in a number corresponding to the number of resins constituting the laminated body are used, and the resin is preferably extruded through multiplex multilayered dies.

In extrusion, the suitable width of a die lip is in the range of 0.3 to 2 mm. On the other hand, the extruding speed can be set so that the peripheral speed of the laminate roll will be as shown in the below-mentioned range.

In the present invention, the peripheral speed of the 10 temperate laminate roll is maintained at 10 to 150 times, especially 20 to 130 times, the extrusion speed of the thermoplastic resin from the die, and the molten film of the thermoplastic resin is preferably reduced in thickness. Within the above-mentioned range, the mechanical adjusting unevenness of the width of the die lip is corrected to provide a more uniform thin film and give a stabilized laminate. If this ratio exceeds the above range, the breakage of the resin is liable to occur unpreferably. When the above ratio is lower than the above range, stabilized lamination is not carried out, and the object of the invention of forming a sufficiently thickness-reduced coating cannot be achieved.

In uses of can-making laminate material, it is preferred in respect of the processability of cans or the characteristics of the cans that the ratio of the thickness (tM) of the metal substrate to the thickness of the coated resin film (tR), namely (tM)/tR, is 2 to 150.

The contact width (nipping width) of the temperate laminate roll at the nipping position may be 1 to 80 mm. This range is important in performing intimate adhesion of the metal substrate firmly to the thermoplastic resin. If this width is smaller than the above range, a sufficient contact time cannot be obtained and as a result, the surface conditions of the coating become poor, or a poor adhesion results. If the width is broader than the above range, it is difficult to increase the nipping pressure, and the laminate material is excessively cooled between nipping rolls whereby the intimate adhesive force tends to be lowered. Preferably, the nipping pressure may be in the range of 1 to 100 kgf/cm$^2$.

To ensure the above nipping width, at least one of the temperate laminate rolls may preferably be an elastic roll.

It is also preferred that the temperate laminate rolls have a surface temperature from 50° C. to [Tm −30° C.] in which Tm is the melting point of the thermoplastic resin. This temperature adjustment may be carried out by a known method of passing a liquid medium having a certain fixed temperature through a roll, or of contacting a temperature-adjusted back up roll with a temperate laminate roll.

In order to prevent heat crystallization or heat degradation, the laminate material after the end of heat adhesion is quenched immediately after the lamination, or in order to prevent heat crystallization, the laminate material after holding it at a certain temperature is quenched at a time before it reaches a crystallization temperature zone. This cooling may be carried out by contacting the laminate material with a blown cooling air, atomized cooling water, cooling water for dipping and a cooling roller.

[Laminate rolls]

According to the present invention, there is provided a temperate laminate roll for laminating a molten film of the thermoplastic resin extruded onto the surface of the metal substrate in which the roll on a side contacting the molten film of the thermoplastic resin is preferably an elastic roll, and the portion press-adhering the molten film of the resin to the metal substrate is preferably adjusted to a temperature of at least 50° C. and at a temperature (T1) that is lower than 30° C. than the melting point of the thermoplastic resin and the other portion is adjusted to a temperature (T2) that is lower than the above-mentioned temperature (T1).

In the present invention, it is preferred that the extrusion laminate roll preferably have a central large-diameter portion for press-adhering the resin molten film to the metal substrate, a level difference portion for receiving a protruding ear portion of the molten film of the resin and a small-diameter portion, and the crossing position between the large diameter portion and the level difference portion may be located outwardly of the width of the metal substrate and inwardly of the width of the resin molten film.

Preferably, the extrusion laminating roll consists of the elastic roll and a coating layer of a fluorine resin adhered to the surface of the elastic roll.

The central large-diameter portion for press-adhering the molten film of the resin to the metal substrate in the above-mentioned extrusion laminating roll preferably have a nipping width of 1 to 80 mm, especially 2 to 50 mm, and further especially 5 to 30 mm.

FIG. 6, A is a side view (one resin layer 4 is omitted for easy understanding), and FIG. 6, B shows the temperature distribution of the laminate roll in the transverse direction corresponding to each position of FIG. 6, A.

The portion for press-adhering the molten film 4 of the resin to the metal substrate is adjusted to a temperature (T1) which is a temperature of at least 50° C. and which is not higher than 30° C. lower than the melting point (Tm) of the thermoplastic resin, and the other portion is adjusted to a temperature (T2) which is lower than the above temperature (T1).

In this embodiment of the present invention, by maintaining the portion for press-adhering the molten film of the resin to the metal substrate at the temperature Ti, the intimate adhesive force between the metal substrate and the molten film of the resin is increased, the formation of creases in the resin film is prevented and the thickness is uniform. Thus, it is possible to produce a resin-coated metal laminate material having high processability and excellent film properties. If this temperature (T1) is lower than 50° C., the intimate adhesiveness of the resin becomes insufficient and the film properties are lowered. On the other hand, when the temperature (T1) is higher than a temperature which is lower by 30° C. than the melting point of the thermoplastic resin, the molten resin film sticks to the roll, and it is difficult to perform the laminating operation smoothly.

The portion other than the portion for press-adhering the molten film of the resin to the metal substrate contacts the ear portion having a large thickness and the bead portion 11 among the molten film of the resin. In this invention, by prescribing the temperature (T2) of this portion at a lower temperature than the temperature (T1), the ear portion is cooled and the winding of the roll on the ear portion can be effectively prevented.

The temperature (T2) is preferably lower than T1 by generally 10 to 150° C., especially 20 to 100° C.

According to the present invention, it is possible to produce a resin metal laminate material in which the resin coating is a thin film and has high performances such as the uniformity of thickness, high processability, high intimate adhesiveness and high film properties. The adhesion of a molten resin film (to be called "ear") protruding from the metal substrate to the roll is prevented and the laminating operation is markedly increased thereby to produce a resin metal laminate material having excellent properties.

The laminate roll 6a (6b) of this invention preferably has a central large-diameter portion 12 for press-adhering the resin molten film 4 to the metal substrate 1, a level difference portion 13 with a diminishing diameter for receiving the protruding ear portion 11 of the resin molten film, and a small-diameter portion in FIG. 6, A. Preferably, the crossing position between the large-diameter portion 12 and the level difference portion 13 is located outwardly of the width of the metal substrate 1 and inwardly of the width of the resin molten film 4.

The level difference between the large-diameter portion 12 and the small-diameter portion varies depending upon the hardness and thickness of the elastic body, but in terms of a radius, it is preferably 0.5 to 20 mm, especially 1 to 10 mm.

The level difference portion 13 with a diminishing diameter and the small-diameter portion 14 are provided in the roll, and this portion receives the ear portion protruding from the metal substrate 1 whereby the adhesion and winding of the ear portion on the roll can be prevented completely. Furthermore, entry of the ear portion 11 having a thick portion into the press-adhering portion between the substrate material and the resin film is prevented, and poor press-adhering can be avoided. Furthermore, a flat portion having a comparatively uniform thickness, among the resin molten film, is provided on the metal substrate, and it is possible to produce a laminate provided with a resin layer having a uniform thickness and properties along the entire width of the metal substrate.

When the crossing position 15 is located inwardly of the width of the metal substrate, poor intimate adhesiveness occurs at a terminal portion of the metal substrate, and furthermore, the degree of neck-in of the extruded resin film becomes large. As a result, the width of the molten resin film becomes narrow as a whole, and this causes inconvenience that the flat portion of the film thickness in the resin film also becomes narrow.

On the other hand, when the crossing position 15 is located outwardly of the width of the resin molten film, the surface of the roll is damaged, poor nipping tends to occur, and roll adhesion to the ear portion also occurs.

The laminate roll used in this invention, as shown in the sectional view of FIG. 7, is made by providing a layer of an elastic (rubber) body 22 on the circumference of a core 20 made of a metal such as iron core, and it is preferred that the uppermost surface of the roll have a coated layer 22 of a tube of a fluorine resin such as Teflon. When the elastic body (rubber) is exposed on the surface of the laminate roll, the resin may be adhered depending upon the temperature. By providing a coating of the fluorine resin on the surface, the adhesion of the resin can be completely prevented irrespective of the variations of the conditions.

In the central large-diameter portion 12 for press-adhering the resin molten film 4 to the metal substrate 1, the nipping width is preferably 1 to 80 mm, especially 2 to 50 mm, more especially 5 to 30 mm. When the laminate roll has a nipping width having a narrower width than the above-mentioned rage, the intimate adhesion force of the resin layer to the metal substrate is lowered, and the surface conditions of the resin coated layer tends to be aggravated.

On the other hand, in the laminate roll having a nipping width broader than the above-mentioned range, the ear portion of the resin is liable to separate at the edge portion of the metal substrate and this tends to become a cause of adhesion of the ear portion to the roll.

In the present invention, an elastic roll is used as the laminate roll, but an elastic body (rubber) constituting the elastic roll preferably have excellent old releasability and excellent heat resistance. Examples of this rubber include a silicone rubber (Q) and a fluorine rubber (FKM), but the fluorine rubber is especially preferred. When a tube of the fluorine resin is coated, the silicone rubber is preferred in respect of the adhesiveness of the fluorine resin tube.

Fluorine rubbers commonly have excellent heat resistance. Suitable examples include fluorine rubbers of the vinylidene fluoride type, the tetrafluoroethylenehexafluoropropylene type, the tetrafluoroethyleneperfluoromethylvinyl ether type, the fluorosilicon type and the fluorophasen type. Of course, the fluorine rubbers are not limited to these examples.

As the silicone rubbers, silicone rubbers having polydimethylsiloxane, polymethylphenylsiloxane and polydiphenylsiloxane as structural units may be used.

These rubbers, as required, may be used in combination with reinforcing agents and fillers such as carbon black and white carbon.

The used elastic body preferably may have a hardness (JIS) of generally 50° to 90°, especially 60° to 90°. The thickness of the elastic body layer is preferably 1 to 30 mm.

The temperature distribution of the laminate roll may be controlled by various means. Although these means should not be limited to the following examples, they can be conducted by varying the thermal conductivities of portions 13 and 14, or by providing a particular temperature-adjusting means.

Figure 8:
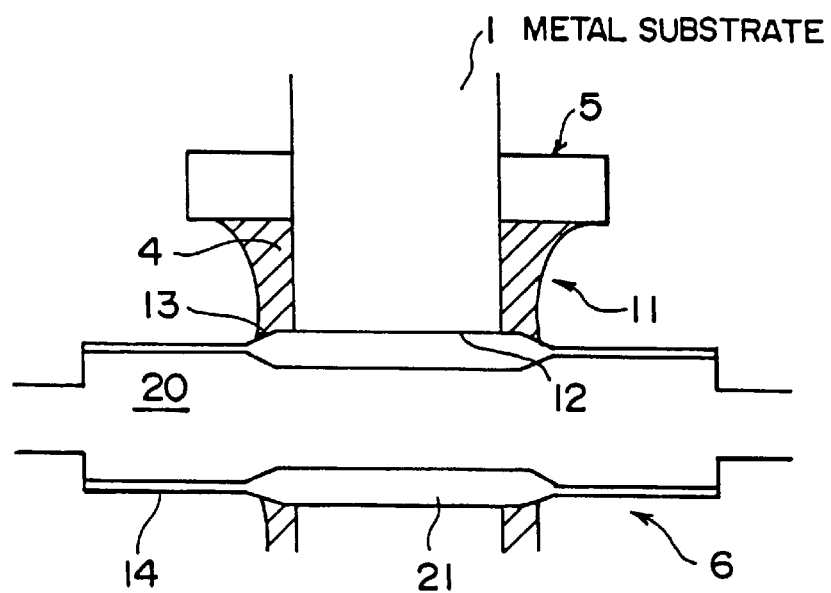
FIG. 8 is a partial sectional side view showing another example of the structure and arrangement of laminate rolls.

For example, in the multilayered roll in FIG. 7 and the iron core-elastic body roll shown in FIG. 8, the thermal conductivity of the iron core is high, and the elastic body has a low thermal conductivity. By maximizing the thickness of the elastic body 12 in the central large-diameter portion 12 for adhering the molten resin film to the metal substrate, minimizing the thickness of the elastic body 12 in the small-diameter 14 at both ends and providing a gradient in the level difference portion 13 such that the thickness may become smaller toward the small-diameter portion, the temperature is high in the central large-diameter portion 12 for press-adhering the molten resin film to the metal substrate, the temperature is low in the portions 13 and 14 for receiving the ear of the resin film, and it is possible to form a temperature distribution suitable in this invention.

Furthermore, it is also effective to cease cooling at the portion for press-adhering the molten resin film to the metal substrate and to compulsorily cool the portion for receiving the ear of the resin film. The compulsory cooling can be easily performed by passing a temperature-adjusted liquid medium, such as cooling water, through the portion for receiving the ear portion of the molten resin film of the laminate roll, or by contacting the above portion with a cooling back-up roll. Of course, at the time of beginning the operation of the apparatus, it is necessary to warm the portion for press-adhering the molten resin film to the metal substrate at room temperature so as to maintain that portion at the temperature (T1), and it is also necessary to cool that portion during operation in which the accumulation of heat becomes large.

Figure 9:
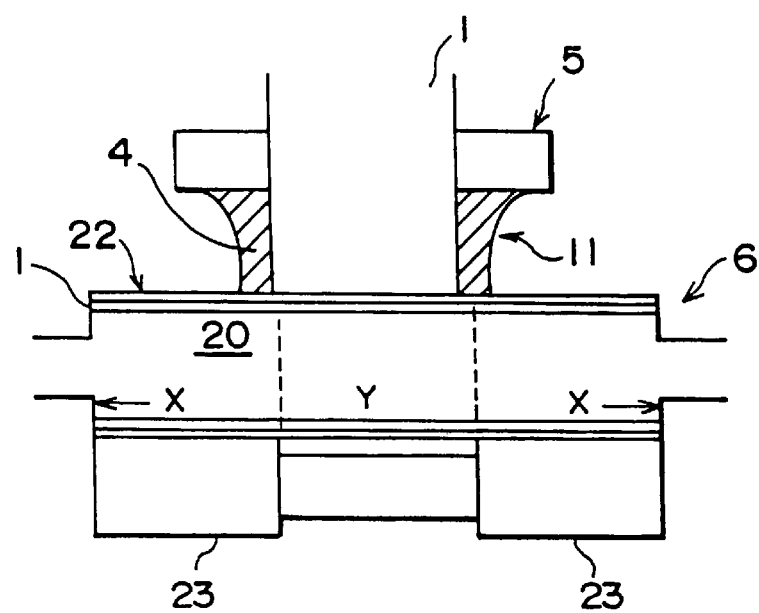
FIG. 9 is a partial sectional side view showing yet another example of the structure and arrangement of laminate rolls.

In the specified example shown in FIG. 9, a portion X for receiving the ear 11 of the resin film in the laminate roll 6 is contacted with the back-up roll 23 so that the above portion is cooled to the temperature (T2). In this example, it is evident that the portion X for receiving the ear 11 of the resin film in the laminate roll and the portion Y for press-adhering the molten resin film to the metal substrate are positioned on the same cylindrical surface, and the portion X may be the small-diameter portions 13 and 14 with a level difference.

Figure 10:
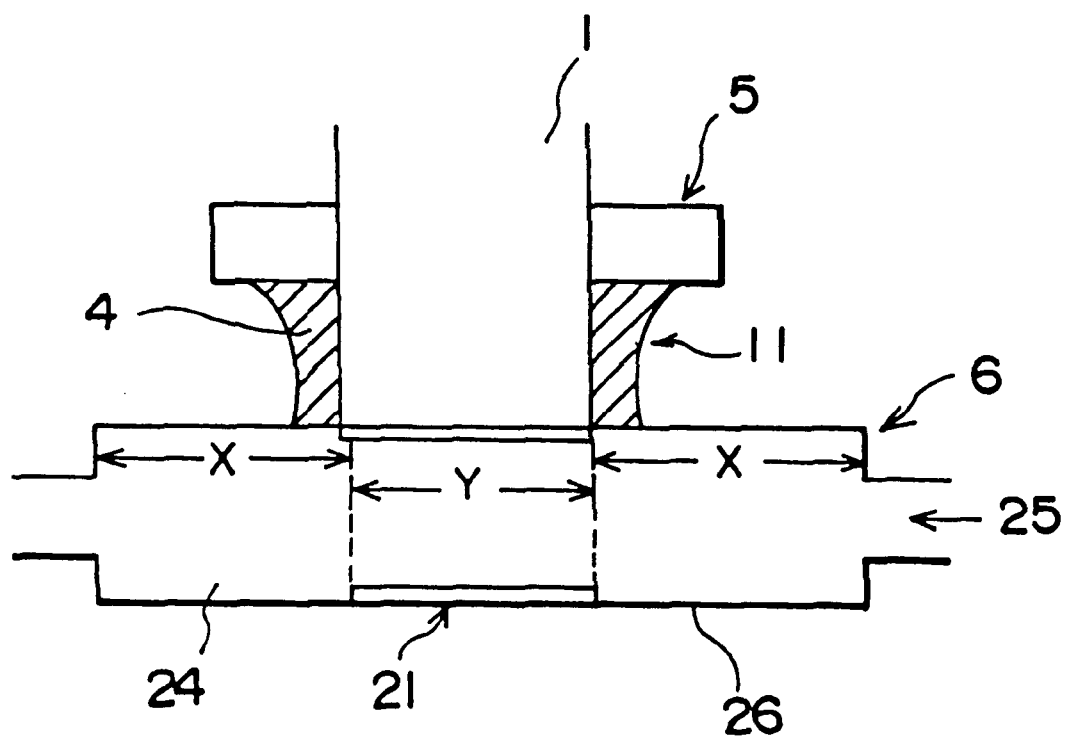
FIG. 10 is a partial sectional side view showing still another example of the structure and arrangement of laminate rolls.

In the specified example shown in FIG. 10, a hollow iron core 24 is used as the laminate roll 6. Cooling water 25 is passed through the iron core 24. A chromium plating layer 26 is applied to the surface of the portion X receiving the ear 11 of the resin film in the roll 6. The elastic body layer 21 is provided in the portion Y for press-adhering the molten resin film to the metal substrate. The portion Y of the roll 6 is cooled with the cooling water 25 and maintained at the above-mentioned temperature (T2). On the other hand, the portion Y is maintained at the aforesaid temperature (T1) by the temperature gradient of the rubber layer. It is evident that in this example, the portion X for receiving the ear 11 of the resin film of the laminate roll 6 and the portion Y for press-adhering the molten resin film to the metal substrate are positioned on the same cylindrical surface, but the portion Y of FIG. 7 may be used as the large-diameter portion 12, and the portion X may be the small-diameter portions 13 and 14 with a level difference.

[EXAMPLES]

The present invention will be described more specifically by citing examples.

[Example 1]

In the construction of the apparatus shown in FIG. 1, a laminate material coated with a resin layer on both surfaces was produced by (1) extruding a resin film of polyethylene terephthalate (PET/IA) having isophthalic acid copolymerized therewith which copolymer had a melting point (Tm) of 220° C., (2) from a pair of T dies having a lip width of 0.8 mm arranged so that the extruded molten resin film is conducted onto the temperate laminate rolls (winding angle: 10°), (3) using a pair of temperate laminate rolls (nipping width: 13 mm) made by winding a fluorine resin rubber around an iron core and adjusting the rolls to a temperature of 130° C., (4) laminating the resin film simultaneously to both surfaces of a coil material of an aluminum alloy (A3004-H19) having a thickness of 0.30 mm and heated at a temperature of 240° C., at a speed of 150 m per minute, and (5) thereafter, subjecting the resulting laminate material to a quenching step with a shower of water and a slight trimming step on both surfaces of the coil both side edges of the laminate.

The resulting laminate material coated with a resin on both surfaces was coated with a wax-type lubricant and punched into a circular plate having a diameter of 150 mm. Thereafter, the circular plate was draw-formed into a container having a diameter of 92 mm in a customary manner as a test.

Furthermore, a JIS No. 5 tenstile sample piece was punched from the resulting laminate material coated with a resin on both surfaces. By measuring the tensile strength of the sample piece, the degree of lowering of the strength of the metal substrate which correlates to the strength (especially the internal pressure strength) of the laminate material formed into a container was examined.

A flat plate sample piece having a square with a size of 10 cm×10 cm was cut out from this laminate material coated with a resin on both surfaces, heat-treated at 205° C. for 2 minutes by assuming a heat history in a printing step after can making, and the heat-treated sample piece was placed on a stand having a laid rubber, and a weight having an amount of 1 kg with a spherical shape having a diameter of 20 mm was dropped on the placed sample piece at 5° C. to give struck injuries (denting test). Thereafter, damages of the resin film were observed.

The present laminate material produced under the conditions satisfying the claims of the present invention had an average thickness of 13 $\mu$m (take-up speed ratio: about 62 times) at each surface of the resin film. The difference (thickness unevenness) between the maximum thickness portion and the minimum thickness portion was as small as 2 $\mu$m. For this reason, in a forming test, creases or breakage of the barrel portion owing to the thickness unevenness was not developed, and poor results such as the breakage or peeling of the resin film were not obtained. In the denting test, the results were very good. Furthermore, the strength of the metal substrate was hardly lowered. The resulting metal laminated material coated with a resin on both surfaces had good properties in all respects.

[Comparative Example 1]

The molten resin film extruded from one of the pair of T dies was kept approximately at right angles to a line connecting the centers of a pair of temperate laminate rolls and fed to the nipping position without contacting the temperate laminate rolls. The T dies were arranged so that the molten resin film extruded from another T die was wound on the temperate laminate roll at an angle of 90° and thereafter, fed to the nipping portion. The metal substrate was adjusted to a heating temperature of 280° C., and wound, through the following plate introduction passage, on the temperate laminated roll at an angle of 30° via the resin film on the temperate laminate roll on which the resin film was wound at an angle of 90', and thereafter, introduced to the nipping portion. Otherwise, the laminate material was produced under the same conditions as in Example 1.

However, the resin film entering at right angles to the line connecting the centers of the temperate laminate rolls adhered to the temperate laminate rolls occasionally. Furthermore, in a portion of a comparatively good laminate state, in spite of the fact that the metal substrate was heated to cause a lowering of strength to a practically unbearable degree, a reduction in temperature was brought about during winding on the temperate laminated roll at a temperature of 130° C. and presumably the temperature of the metal substrate falls below the temperature of the metal substrate required for adhesion at the time of lamination at the nipping portion. However, the adhesive force was very weak, and the metal substrate was peeled at the time of sampling. The resin film on the opposite side had an average thickness of 14 $\mu$m, but the thickness unevenness of 11 $\mu$m resulted. An adhesive interface between the metal substrate and the resin film contained many bubbles. For this reason, it was impossible to produce a satisfactory laminate material.

[Comparative Example 2]

A laminate material was produced under the same conditions as in Example 1 except that owing to the structure of a T die, the molten resin film extruded from a lip portion contacted the metal substrate immediately after extrusion so that the winding angle of the resin film to the temperate laminate roll became 0°. The thickness unevenness of the resin film on every one surface was as large as about 8 microns, and the winding of bubbles in the adhesion interface between the resin film and the metal substrate was seen. Furthermore, in a draw forming test, a fine peeling of the resin film occasionally occurred partly presumably because irregular banks of the molten resin film occurred at the nipping position and the melt-adhesion to a non-uniformly heated metal substrate was caused. In the denting test, fine cracking of the coating occurred depending upon places. During lamination, the resin adheres frequently to the temperate laminate roll, and it was impossible to produce a stabilized laminate material continuously.

[Comparative Example 3]

A laminating material was produced under the same conditions as in Example 1 except that by the arrangement of T dies, the winding angle of the extruded molten resin film to the temperate laminate roll becomes 50°. As a result, three comparatively continuous streaky thin portions occurred in the resin film of the laminate material in a vertical direction (thickness unevenness: about 10 $\mu$m), and at the time of draw formation test, these portions became creases and caused breakage of the barrel portion.

[Comparative Example 4]

A laminate material was produced under the same conditions as in Example 1 except that the relation between the extruding speed and the plate travelling speed of the metal substrate (the peripheral speed of the temperate laminate roll) was adjusted (take-up speed ratio: 160 times) so that the average thickness of the resin-coated film of every one surface after lamination became 5 $\mu$m. However, cutting of the molten resin film occurred, and it was impossible to produce a laminate material.

[Comparative Example 5]

A laminate material was produced under the same conditions as in Example 1 except that the width of the lip in a T die was adjusted to 0.2 mm, and the relation between the extruding speed and the plate travelling speed of the metal substrate (the peripheral speed of the temperate laminate roll) was adjusted (take-up speed ratio: 8 times) so that the average thickness of the resin coated film on every one surface became 25 $\mu$m after lamination. As a result, thickness unevenness (about 22 $\mu$m) was generated because the accuracy of adjusting the nipping width to a uniform value in the direction of the width of the metal substrate was poor, and there will be influences of fluctuations of the extruded amount by the pulsating movement of the extruder. In the draw formation test, creases occurred partly and the barrel portion was broken.

[Comparative Example 6]

Except that the temperature of the laminate roll was adjusted to 25° C., a laminate material was produced under the same conditions as in Example 1, and evaluated and tested. However, the resin film was delaminated during draw formation test.

[Comparative Example 7]

It was intended to produce a laminate material under the same conditions as in Example 1 except that the temperature of the temperate laminate roll was adjusted to 210° C. However, the resin was adhered to the temperate laminate roll, and a laminate material could not be produced.

[Comparative Example 8]

A laminate material was produced under the same conditions as in Example 1 except that a metal roll which does not elastically deformed (nipping width: liear) formed by applying a chromium plating to the surface of an iron core was used as a temperate laminate roll. However, only a laminate material could be formed which contained bubbles enfolded between the coated resin film and the metal substrate, or creases formed in the resin film itself.

[Comparative Example 9]

A laminate material was produced under the same conditions as in Example 1, evaluated and tested except that a pair of temperate laminate rolls having a nipping width of 60 mm were used by wrapping a fluorine rubber having a lower hardness than Example 1 in a more thick pattern. However, the nipping width was low and the temperature was excessively lowered during nipping, and the adhesive force of the resin film was weak. During the draw forming test, the resin film was delaminated.

[Example 2]

A laminating material was produced under the same conditions as in Example 1, evaluated and tested except that an aluminum alloy, A5052-H19, having a thickness of 0.23 mm was used as the metal substrate. The draw formation test and the denting test both showed good results. The resin film was not broken and was not delaminated. The resulting metal laminate material had a resin coating on both surfaces.

[Example 3]

A laminating material was produced under the same conditions as in Example 1, evaluated and tested except that an electrolytic chromic acid treated steel plate having a thickness of 0.20 mm was used as the metal substrate. Both the draw forming test and the denting test showed good results. The resin film was not broken nor delaminated, and the resulting laminate was a metal laminate material having a resin coating on both surfaces.

[Example 4]

A laminate material was produced under the same conditions as in Example 1, evaluated and tested except that, as the thermoplastic resin film of the one side, a two-layer molten extruded resin film composed of the same resin as used in Example 1 on the side contacting the metal substrate and a mixture of the same resin and 10% of $TiO_2$ (inorganic pigment) on the surface side (air side) was used. The draw forming test and the denting test both showed good results. The resin film was not broken nor delaminated. The resulting laminate material was a metal laminate material having a resin coating on both surfaces which possessed good properties.

[Example 5]

In the construction of the apparatus shown in FIG. 1, a laminate material coated with a resin layer on both surfaces was produced by (1) extruding a resin film of polyethylene terephthalate having isophthalic acid copolymerized therewith which copolymer had a melting point (Tm) of 220° C., (2) from a T die having a lip width of 0.80 mm arranged so that the extruded molten resin film is conducted onto the temperate laminate rolls (winding angle: 20°), (3) using a pair of temperate laminate rolls (nipping width: 13 mm) made by winding a fluorin resin rubber around an iron core and adjusting the rolls to a temperature of 130° C., (4) laminating the resin film simultaneously to both surfaces of a coil material of an aluminum alloy (A3004-H19) having a thickness of 0.30 mm and heated at a temperature of 240° C., at a speed of 150 m per minute, and (5) thereafter, subjecting the resulting laminate material to a quenching step with a shower of water and a slight trimming step on both surfaces of the coil.

A rectangular test piece having a width of 15 mm was cut out from the resulting resin-coated metal laminate material, and in accordance with a customary manner, the adhesive strength of the resin film was examined by a peeling test.

A flat test piece having a square shape (10 cm×10 cm) was cut out from the resulting metal laminate material, heat-treated at 205° C. for 2 minutes by assuming a heat history in a printing step after can making, and the heat-treated sample piece was placed on a stand having a laid rubber, and a weight having an amount of 1 kg with a spherical shape having a diameter of 20 mm was dropped on the placed sample piece at 5° C. to give struck injuries (denting test). Thereafter, damages of the resin film were observed.

In the above-prepared resin-coated metal laminate material prepared under the conditions satisfying the claims of this application, the resin film on every surface had an average thickness of 13 μm (the take-up speed ratio: about 62 times), and the difference (thickness unevenness) between the maximum thickness portion and the minimum thickness portion was as small as 2 μm. The resin film satisfactorily had an adhesive force of about 1.7 kg/15 mm. No problem was raised in the bonding test. The resulting resin-coated metal laminate material was good in all respects.

[Example 6]

A laminate material coated with a resin on both surfaces was prepared and evaluated in the same way as in Example 5 (FIG. 5) except that in Example 5, the resin used in Example 5 was converted to a film biaxially stretched and prepared in accordance with a customary manner in a separate step and fed to the T die from an opposite side of the metal substrate. As a result, this method could also give a laminated material coated with a resin on both surfaces.

[Comparative Example 10]

A laminate material was produced in the same way as in Example 5 except that the heated metal substrate was tilted at an angle of 30° and was wound onto the temperate laminate roll located opposite from the side of the T die.

The resulting laminate material had a very low adhesive force measured by the peeling test.

[Comparative Example 11]

It was intended to produce a laminate material in the same way as in Comparative Example 10 except that with respect to Comparative Example 10, T dies were provided so that the extruded molten resin film was introduced approximately at right angles (winding angle: 0°) to a line connecting the centers of a pair of temperate laminate rolls. However, the molten resin film adhered to the laminate rolls, and a laminate material could not be produced.

[Comparative Example 12]

A laminate material was produced under the same conditions as in Example 5 except that the winding angle of the resin film onto the temperate laminate roll was adjusted to 0° by contacting the molten resin film extruded from the lip portion depending upon the structure of the T die, with the metal substrate immediately after the extrusion. However, the thickness unevenness of the resin film was slightly as large as about 10 microns, and bubbles were enfolded in the adhesive interface between the resin film and the metal substrate. In the denting test, fine peeling or cracking was caused partly in the resin film presumably owing to the occurrence of irregular banks in the molten resin film at the nipping portion and press-adhesion to a nonuniform heated metal substrate. Incidentally, the resin adhered frequently to the temperate laminate roll during lamination, and it was impossible to produce a stable laminate material continuously.

[Comparative Example 13]

A laminate material was produced under the same conditions as in Example 5 except that by the arrangement of T dies, the winding angle of the extruded molten resin film onto the temperate laminate roll was adjusted to 50°. As a result, two comparatively continuous streaky thin portions (thickness unevenness: about 12 μm) occurred in the resin film of the laminate material in a vertical direction, and the resulting laminate material was not satisfactory.

[Comparative Example 14]

It was intended to produce a laminate material under the same conditions as in Example 5 except that the relation between the extruding speed and the plate speed (the peripheral speed of the temperate laminate roll) of the metal substrate was adjusted (the take-up speed ratio: 160 times) so that the average coated resin film thickness on every one surface after lamination became 5 μm. However, the molten resin film was cut off, and it was impossible to produce a laminate.

[Comparative Example 15]

A laminate material was produced under the same conditions as in Example 5 except that the lip width of the T die was adjusted to 0.2 mm, and the relation between the extruding speed and the plate travelling speed of the metal substrate (the peripheral speed of the temperate laminate roll) was adjusted (the take-up speed ratio: 8 times) so that the average coated resin film on every one surface after lamination would become 25 μm. As a result, thickness unevenness (about 20 μm) was generated presumably because the accuracy of adjusting the nipping width to a uniform value by the method of using the width of the metal substrate was poor, and there would be influences of fluctuations of the extruded amount by the pulsating movement of the extruder. The resulting laminate material was not satisfactory.

[Comparative Example 16]

A laminate material was produced under the same conditions as in Example 5 except that the temperature of the laminate roll was changed to 25° C. However, the resulting laminate material had only a very low adhesive force of 200 g/15 mm measured by the peeling method.

[Comparative Example 17]

It was intended to produce a laminate material under the same conditions as in Example 5 except that the temperature of the temperate laminate roll was changed to 210° C. However, the resin adhered to the temperate laminate roll, and it was impossible to produce the laminate material.

[Comparative Example 18]

It was intended to produce a laminate material under the same conditions as in Example 5 except that a metal roll obtained by applying a chromium plating to the surface of an iron core, which metal roll was not elastically deformed at the time of nipping (nipping width: linear), was used as the temperate laminate roll. However, the resulting laminate material had a surface condition in which bubbles were enfolded between the coated resin film and the metal substrate and creases formed in the resin film itself.

[Comparative Example 19]

A laminate material was produced under the same conditions as in Example 5, evaluated and tested except that as compared with Example 5, a fluorine rubber having a low hardness was wound in a thicker layer and a pair of temperate laminate rolls having a nipping width of 60 mm were used. However, because it seemed that the nipping pressure was low and the temperature was excessively lowered during nipping, the adhesive force of the resin film was weak and the resin film was delaminated during the denting test.

[Example 7]

A laminate material was produced under the same conditions as in Example 5, evaluated and tested except that an electrolytic chromic acid treated steel plate having a thickness of 0.20 mm was used as the metal substrate. The resulting resin coated metal laminate material had a sufficient adhesive force and showed excellent results in the denting test.

[Example 8]

A laminate material was produced under the same conditions as in Example 5 except that a two layer melt-extruded resin film composed of the resin shown in Example 5 on the side contacting the metal substrate and a mixture of the same resin and 10% of $TiO_2$ as an inorganic pigment on the side of a surface layer (air) were used. A resin-coated metal laminate material having excellent adhesive force and excellent results of the denting test was obtained.

[Example 9]

Using an apparatus having a construction and an arrangement shown in FIG. 1, a resin film of polyethylene terephthalate having isophthalic acid copolymerized therewith (PET/IA) with a melting point (Tm) of 220° C. was extruded from a T die, laminated on a coil material composed of an aluminum alloy (A3004.H19) having a thickness of 0.26 mm and heated to 240° C. at a speed of 150 mm per minute, and thereafter, subjecting the laminate material to a quenching step with a shower of water and a slight trimming step on both sides to thereby produce a resin coated laminate material.

At this time, a fluorine rubber was wound around the iron core as shown in FIG. 8. To avoid a damage caused to the surface of the roll by an eye bead portion of the ear portion protruding from the resin molten film, and poor intimate adhesiveness of the metal substrate and the resin molten film due to a poor nipping, a central large-diameter portion for press-adhering the resin molten film to the metal substrate, a level difference portion receiving the protruding from the resin molten film and a small-diameter portion were provided.

The position of the level difference portion should be outwardly of the width of the metal substrate to provide a film thickness flat part on the entire surface of the metal substrate, and should be inwardly of the width of the molten resin film to prevent poor nipping (press-adhesion) or adhesion of the resin to the roll of the ear portion protruding from the resin molten film. Furthermore, a portion for press-adhering the metal substrate and the resin molten film should be adjusted to a temperature of 170° C. to ensure an intimate adhesion in the metal substrate and the resin film. A portion receiving the ear part protruding from the resin molten film should be adjusted to a temperature of 130° C. to prevent the adhesion of the resin to the roll at the ear part protruding from the metal substrate. Thus, a pair of temperate laminate rolls (nipping width: 9 mm) having a temperature difference are used.

The resulting resin coated laminate material was rolled by a rolling machine so that the corresponding distortion ($\epsilon$) became 1.4, and cuts are made by a commercially available cutter to provide 2 mm squares in vertical and transverse 20 mm ranges in a checkerboard. Scotch Brand Tape with a width of 25 mm (made by Sumitomo 3M) is pasted, thereafter, the tape is stripped off and a peeling test is carried out to examine the adhesive strength.

The above resin coated laminate material was coated with a wax type lubricant and then punched into a circular plate having a diameter of 150 mm, and the circular plate was tested to make a draw formed container having a diameter of 92 mm in accordance with a customary method.

This laminate material produced under the conditions satisfying the claims of this application was a laminate material having a uniform film thickness on the entire surface of the substrate. In the peeling test, $\epsilon=1.4$ and the peeling rate was as good as below 20%. In the molding test, poor results such as peeling did not occur, and in all respects, a good resin coated laminate material was obtained.

[Comparative Example 20]

It was intended to produce a laminate material in the same way as in Example 7 except that elastic body rolls having a uniform iron core shape and a uniform roll surface shape and having an adjusted roll temperature of 170° C. were used. However, the ear portion protruding from the resin molten film adhered to the roll or was wound onto the roll, and struck injuries occurred on the surface of the roll by the edge bead portion. Furthermore, the surface of the laminate material enfolds bubbles between the metal substrate and the resin film owing to poor nipping, or creases of the resin film itself or thickness unevenness occurred. It was impossible to produce a laminate material.

[Comparative Example 21]

A laminate material was produced in the same way as in Example 7 except that the position of level difference was changed to the inward side of the metal substrate. However, since the end portion of the substrate was not nipped by the roll, this portion did not adhere intimately. Furthermore, since neck-in became large, the width of the molten resin film became narrow, and the film thickness flat portion also became narrow.

[Comparative Example 22]

A laminate material was produced in the same way as in Example 7 except that the level difference position was located inwardly of the metal substrate. However, since the neck-in became small and the width of the film was broadened, struck injuries were generated on the surface of the roll at the edge bead portion of the resin film. Furthermore, the ear portion protruding from the resin molten film adhered to the roll. The surface of the laminate material was poor owing to the poor nipping.

[Comparative Example 23]

It was intended to produce a laminate material under the same conditions as in Example 7 except that the central large-diameter portion for press-adhering the resin molten film to the metal substrate, the level difference portion for receiving the ear portion protruding from the resin molten film, and the small-diameter portion were adjusted uniformly to a roll temperature of 170° C. However, the ear portion protruding from the resin molten film adhered to the roll and was wound on the roll, and it was impossible to produce a laminate material.

[Comparative Example 24]

A laminate material was produced under the same conditions as in Example 7, evaluated and tested except that the roll temperature of the portion for press-adhering the resin molten film to the metal substrate was changed to 25° C. Although the ear portion protruding from the resin molten film did not adhere to the roll or was not wound on the roll, $\epsilon=1.4$, the entire surface was peeled, and the resin film was delaminated during the molting test.

[Comparative Example 25]

It was intended to produce a laminate material under the same conditions as in Example 7 except that the roll temperature of the central large-diameter portion for press-adhering the resin molten film to the metal substrate was changed to 200° C. However, the resin adhered to the central large-diameter portion of the roll for press-adhering the resin molten film to the metal substrate, and it was impossible to produce the laminate material.

[Example 10]

A laminate material was produced under the same conditions as in Example 7, evaluated and tested except that a roll (FIG. 7) obtained by adhesively coating a tube of a fluorine resin on the surface of a roll having a cross-section shown in FIG. 8 was used, a portion for press-adhering the resin molded film to the metal substrate was adjusted to 200° C. and a portion for receiving the ear portion protruding from the resin molten film was adjusted to 160° C. As a result, by adhesively coating a tube of a florine resin on the surface of a roll, the ear portion protruding from the resin molten film did not adhere to the roll or was not wound onto the roll. In the peeling test, $\epsilon=1.4$, the peeling rate was below 15%, and the intimate adhesiveness increased to a good state. Further, in the molding test, the resin film was not broken, nor peeled. In all respects, the resulting laminate material having a resin coating showed good properties.

[Comparative Example 26]

A laminate material was produced under the same conditions as in Example 8, evaluated and tested except that the thickness of the rubber was increased, and the nipping width was changed to 85 mm. However, the ear portion was easier to separate than the edge portion of the substrate, and it was easy to adhere to the roll or be wound on the roll. In the peeling test, the nipping width was inferior to 9 mm.

[Comparative Example 27]

It was intended to produce a laminate material under the same conditions as in Example 8 except that a roll produced by melt spraying a Teflon onto the surface of an iron core with a nipping width of not larger than 2 mm was used. However, bubbles were enfolded between the metal substrate and the resin film owing to poor nipping, or creases formed in the resin film itself or thickness unevenness occurred. It was impossible to produce the laminate material.

[Example 11]

A laminate material was produced under the same conditions as in Example 7, evaluated and tested except that a central large-diameter portion for press-adhering the resin molten film to the metal substrate and having a uniform iron core shape, a level difference portion for receiving the ear portion protruding from the resin molten film, and a small-diameter portion were provided, a backup roll having a portion for receiving an ear portion protruding from the resin molten film ashesion in FIG. 9 was adjusted to 160° C. by using a fluorine tube-coated roll which was uniformly adjusted to a temperature of 200° C. As a result, the ear portion protruding from the resin molten film-did not adhere to the roll, nor was wound on the roll. In the peeling test, $\epsilon=1.4$ an the peeling rate was as good as 15% or below. In the molding test, the resin film was not broken nor peeled. In all respects, the resin coated laminate material had good properties.

[Example 12]

A laminate material was produced under the same conditions as in Example 7, evaluated and tested except that as shown in FIG. 10, the central large-diameter portion for press-adhering the resin molten film to the metal substrate was an elastic body roll coated with a tube of a fluorine resin, the level difference portion for receiving the ear portion protruding from the resin molten film and the small-diameter portion were a metal roll made by applying a chromium plating to the surface of an iron core, and a temperature adjusting water was circulated in the inside of the roll to provide a temperature difference between the large-diameter portion and the level difference portion, small-diameter portion by the cooling effect of the metal portion having good thermal conductivity. As a result, the ear portion protruding from the resin molten film did not adhere to the roll nor was wound onto the roll, and there was obtained a resin coated laminate material having good results in the peeling test and the molding test.

The results of some of the above Examples and Comparative Examples showed the following results.

TABLE 1

| | Roll | | | | | | |
|---|---|---|---|---|---|---|---|
| | | Shape | | Temperature (° C.) | | | |
| | | | | | Level difference portion* | | |
| | Structure | Step | Surface of the roll | Large-diameter portion | small-diameter portion | Level difference position | Nipping width |
| Example 9 | fluorine rubber | no step | step | 170 | 130 | outwardly of the width of the substrate    inwardly of the width of the resin film | 9 mm |
| Comparative Example 20 | " | step | no step | 170 | | — | 9 mm |
| Comparative Example 21 | " | step | step | 170 | 130 | inwardly of the width of the substrate | 9 mm |
| Comparative Example 22 | " | step | step | 170 | 130 | outwardly of the width of the resin film | |
| Comparative Example 23 | " | step | step | | 170 | outwardly of the width of the substrate    inwardly of the width of the resin film | 9 mm |
| Comparative Example 24 | " | step | step | | 25 | outwardly of the width of the substrate    inwardly of the width of the resin film | 9 mm |
| Comparative Example 25 | " | step | step | 200 | 130 | outwardly of the width of the substrate    inwardly of the width of the resin film | 9 mm |
| Example 10 | rubber + fluorine tube | step | step | 200 | 160 | outwardly of the width of the substrate    inwardly of the width of the resin film | 9 mm |
| Comparative Example 26 | rubber + fluorine tube | step | step | 200 | 160 | outwardly of the width of the substrate    inwardly of the width of the resin film | 85 mm |
| Comparative Example 27 | teflon flame spraying | step | step | 200 | 160 | outwardly of the width of the substrate    inwardly of the width of the resin film | ≦2 mm |
| Example 11 | rubber + fluorine tube | step | step | 200 | 160 | outwardly of the width of the substrate    inwardly of the width of the resin film | 9 mm |
| Example 12 | rubber + metal | step | step | 170 | 130 | outwardly of the width of the substrate    inwardly of the width of the resin film | 9 mm |

| | | | Evaluation | | | |
|---|---|---|---|---|---|---|
| | | | | Peeling test (ε = 1.4) | | |
| | Other conditions | Adhesion of the resin to the rolls | The state of the laminate material | Peeling rate (%) | Evaluation of peeling | Molding test |
| Example 9 | | ○ | ○ | ≦20 | ○ | ○ |
| Comparative Example 20 | | X (ear portion) | X (poor nipping) | — | — | — |
| Comparative Example 21 | | ○ | X (poor intimate adhesion of the end portion of the substrate) | — | — | — |
| Comparative Example 22 | | X (ear portion) | X | — | — | — |
| Comparative Example 23 | | X (ear portion) | X | — | — | — |
| Comparative Example 24 | | ○ | ○ | 100 | X | X (delaminated) |
| Comparative Example 25 | | X (center large-diameter portion) | X | — | — | — |
| Example 10 | | ○ | ○ | ≦15 | ○ | ○ |
| Comparative Example 26 | | Δ (ear portion) | ○ | ≦40 | Δ | Δ |
| Comparative Example 27 | | ○ | X (poor nipping) | — | — | — |

TABLE 1-continued

| | | | | | | |
|---|---|---|---|---|---|---|
| Example 11 | using a backup roll | ○ | ○ | ≦15 | ○ | ○ |
| Example 12 | temperature-adjusted water circulation | ○ | ○ | ≦20 | ○ | ○ |

What is claimed:

1. A process for producing a resin metal laminate material by forming a resin coating on at least one surface of a metal substrate, the process comprising:

providing a heating zone for the metal substrate, a die for feeding a thermoplastic resin in a film form, a pair of temperate laminate rolls for adhering the thermoplastic resin to at least one surface of the metal substrate, and quenching means for quenching the resulting laminate material along a passage for the metal substrate, supporting and conveying a molten film of the thermoplastic resin from the die with the corresponding temperate laminate rolls and feeding it to a nipping position between the temperate laminate rolls, and fusing a thin film of the thermoplastic resin to at least one surface of the heated metal substrate by the temperate laminate rolls, wherein the heated metal substrate is passed between the pair of temperate laminate rolls at approximately a right angle to a line connecting the centers of the temperate laminate rolls and the molten film of the thermoplastic resin from the die is conducted at approximately a tangential line with respect to the corresponding laminate roll and at a winding angle of 2 to 45 degrees to the temperate laminate roll.

2. A process of claim 1 wherein a pair of dies are provided against a passage for the metal substrate, the heated metal substrate is passed between the pair of temperate laminate rolls and approximately at right angles to a line connecting the centers of the temperate laminate rolls, supporting and conveying a molten film of the thermoplastic resin from each die with the corresponding temperate laminate rolls and feeding it to the nipping position between the temperate laminated rolls, and fusing the thin film of the thermoplastic resin simultaneously to both surfaces of the metal substrate.

3. The process of claim 1 wherein means for feeding the molten film of the thermoplastic resin from the die and the thermoplastic resin film are supported and conveyed with the corresponding temperate laminate rolls and fed to the nipping position between the temperate laminate rolls, and the molten thin film of the thermoplastic resin and the thermoplastic resin film are simultaneously fused respectively to one surface of the heated metal substrate and to the other surface.

4. The process of claim 1 wherein the molten thin film of the thermoplastic resin is thickness-reduced by adjusting the peripheral speed of the temperate laminate roll to 10 to 150 times the extrusion speed of the thermoplastic resin from the die.

5. The process of claim 1 wherein the process comprises heating the metal substrate, immediately before nipping, so that the temperature is adjusted to Tm−80° C. to Tm+50° C., where Tm is the melting point of the thermoplastic resin, if the metal substrate is a tin-free steel and is adjusted to Tm−30° C. to 250° C. if the metal substrate is aluminum.

6. The process of claim 1 wherein the contact width of the temperate laminate roll at the nipping position is 1 to 80 mm.

7. The process of claim 1 wherein at least one of the temperate laminate rolls is an elastic body roll.

8. The process of claim 1 wherein each of the temperate rolls has a surface temperature which is lower than the temperature of the metal substrate and is 50° C. to (Tm) −30° C. in which Tm is the melting point of the thermoplastic resin.

9. The process of claim 1 wherein the ratio of the thickness of the metal substrate to the thickness of the resin film on each one surface is 2 to 150.

10. The process of claim 1 wherein the thermoplastic resin is a thermoplastic polyester or copolyester, its blend or its laminate.

11. The process of claim 1 wherein at least one thermoplastic resin contains a pigment.

12. The process of claim 1 wherein the resin metal laminate material is a can-making laminate blank.

13. The process of claim 1 wherein the roll on the side contacting the molten film of the resin is an elastic body roll, the portion of the roll for press-adhering the molten film of the resin to the metal substrate is adjusted to a temperature (T1), which is at least 50° C. and is 30° C. lower than the melting point of the thermoplastic resins and the portion of the roll other than the portion for press-adhering the molten film is adjusted to a temperature (T2), which is lower than the temperature (T1).

14. The process of claim 13 wherein the laminate roll has a central large-diameter portion for press-adhering the resin molten film to the metal substrate, a level difference portion for receiving an protruding ear portion of the resin molten film, and a small-diameter portion, the crossing position between the large-diameter portion and the level difference portion is outwardly of the width of the substrate and is inwardly of the width of the resin molten film.

15. The process of claim 13 wherein the laminate roll is composed of an elastic body roll and a coating of a fluorine resin adhered to the surface of the elastic body roll.

16. The process of claim 14 wherein the laminate roll has a nipping width of 1 to 80 mm at the central large-diameter portion for press-adhering the resin molten film to the metal substrate.

17. The process of claim 13 wherein the laminate roll has a nipping width of 1 to 80 mm at the portion for press-adhering the resin molten film to the metal substrate.

* * * * *